L. J. FLINT.
INTERRUPTER.
APPLICATION FILED MAY 18, 1911.
1,062,090.
Patented May 20, 1913.
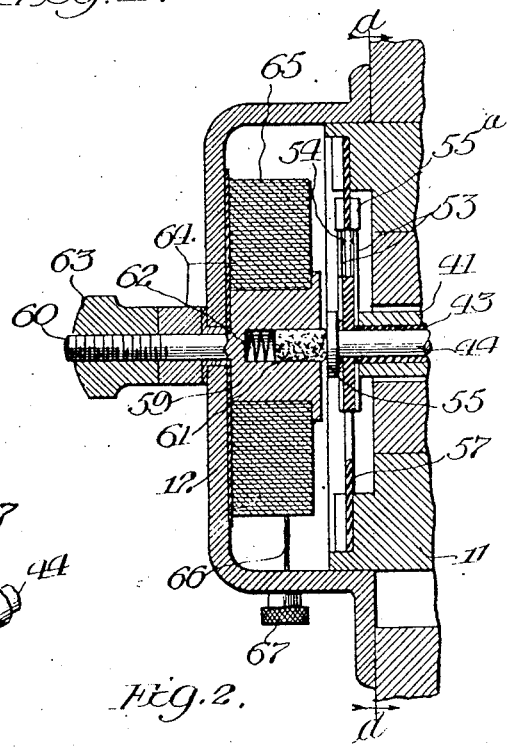
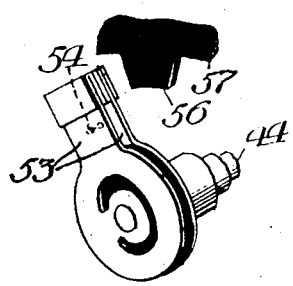
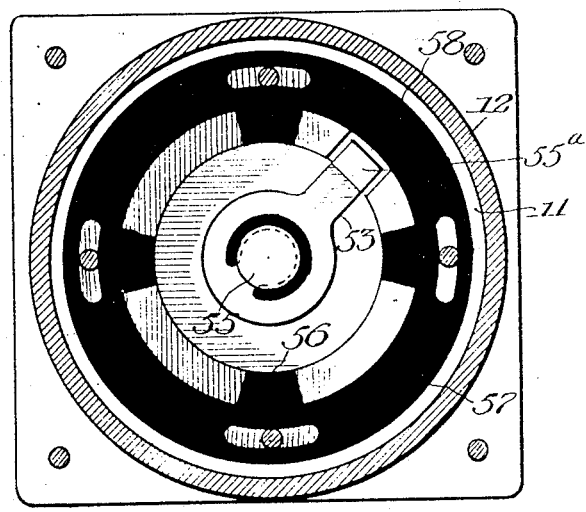
Witnesses
Inventor
Louis J. Flint

UNITED STATES PATENT OFFICE.

LOUIS J. FLINT, OF CHICAGO, ILLINOIS, ASSIGNOR TO GRIP NUT COMPANY, OF CHICAGO, ILLINOIS, A CORPORATION OF ILLINOIS.

INTERRUPTER.

1,062,090.  Specification of Letters Patent.  Patented May 20, 1913.

Original application filed September 13, 1910, Serial No. 581,915. Divided and this application filed May 18, 1911. Serial No. 627,957.

*To all whom it may concern:*

Be it known that I, LOUIS J. FLINT, a citizen of the United States, residing at Chicago, in the county of Cook and State of Illinois, have invented a certain new and useful Improvement in Interrupters, of which the following is a full, clear, concise, and exact description, reference being had to the accompanying drawings, forming a part of this specification.

This invention relates to my improved interrupter and has for its object the provision of an improved device of this nature which possesses good insulating characteristics and which can be operated at a high rate of speed without injury from either electrical or mechanical causes, but which is at the same time economical to manufacture.

An additional object is to provide an interrupter which has a quick break and also gives no mechanical pounding on the platinum contacts in closing the circuits.

The subject matter of this application is a division of my co-pending case for magneto generators; Serial No. 581,915, filed September 13, 1910.

In the accompanying drawings, which form a part of this specification, Figure 1 is a longitudinal elevation taken through the axis of the machine; Fig. 2 is a sectional view on lines *d—d* of Fig. 1; and Fig. 3 is a detailed perspective view of the spring contacts and one of the interrupting projections.

The interrupter is shown mounted upon the end of an armature shaft 44 of a machine whose current it is desired to control. Two spring plates 53 are mounted so as to revolve with the shaft 44, one of said spring plates being electrically connected with said shaft while the other is insulated from the shaft by a bushing such as 43. A disk of insulating material also is provided, which separates said spring plates except at the contact point 54. The inner spring plate is electrically connected to a sleeve 41 concentric with the shaft 44 and bushing 43. Surrounding the end of the shaft 44 is a ring 11 which carries an annular disk of insulating material 57, provided with projections 56. The disk 57 is mounted in a plane midway between the planes of the springs 53, so that the projections 56 separate the contact points 54 by periodically passing between the wiping plates 55ª, which are carried by the outer extremities of the springs 53.

Carried on a flange of the ring 11 is a plate 12 within which is provided a condenser 65, which is wound upon but insulated from the lug 59 on the inner side of said plate. The condenser is connected across the plates 53 for the purpose of reducing the sparking upon breaking the circuit. Such connections are made to one side of the condenser by means of a wire 66 leading to a binding post 67, which is grounded upon the frame of the machine, and thus connected with the inner plate 53 which is in contact with the grounded sleeve 41. The other side of the condenser is connected to the outer plate 53 by means of a brush 61 which is pressed against a collar 55 by a spring 62 on the end of the shaft 44, from which the current passes to the lug 59 and the post 60. Carried by the post 60 is a suitable nut 63, which binds the wire 64 leading to the other side of the condenser.

It will thus be seen that applicant has provided a cheap and effective interrupter capable of producing a large number of interruptions in a circuit in which it may be connected. Moreover, as tips 55ª are worn away by passing over the projections 56, the springs 53 force fresh surfaces into contact, giving an automatic adjustment of the spark points to compensate for wear and allowing the plates 55ª to be entirely used up before needing to be renewed.

Having thus described my invention what I claim as new and desire to secure by Letters Patent is:

1. An interrupter comprising a rotary shaft, a pair of contact springs carried by and rotating with said shaft, and a ring supported in position surrounding said shaft, but with space between the ring and shaft, in which space said contact springs rotate, said ring and springs being provided with coöperating devices by which the springs are caused to make and break contact with one another.

2. An interrupter comprising a rotary shaft, a pair of springs mounted upon and rotating with said shaft, a ring supported in position surrounding the shaft, but with space between the ring and shaft, in which space said springs revolve, said ring being provided with radially extending projections arranged to coöperate with said springs to cause contact and separation of the same.

3. The combination of a rotary shaft, a pair of springs mounted upon and rotating with said shaft, a ring surrounding said shaft with space between said ring and said shaft, said ring being provided with inwardly extending radially disposed projections arranged in the path of travel of the outer ends of said springs to act upon the same.

4. The combination with a rotary shaft of a pair of contact members mounted upon and rotating with said shaft, a ring surrounding said shaft but with space between said ring and shaft, in which space said contact members revolve, said ring and contact members being provided with coöperating instrumentalities to bring about a make and break action of said contact members, and means whereby said ring may be given a rotary adjustment.

5. The combination of a rotary shaft, a pair of spring contact members mounted upon and rotating with said shaft, an insulating ring surrounding said shaft, but with space between said ring and said shaft, in which space said contact members revolve, said ring being provided with radially extending projections adapted to bring about a make and break action on the part of said contact members, said ring being also provided with segmental slots and pins extended through said slots.

6. An interrupter comprising in combination, a rotary shaft, a pair of springs carried on said shaft and normally in contact with each other, one of said springs being in electrical contact with said shaft, and one spring being insulated therefrom, and means to periodically separate said springs.

7. An interrupter comprising in combination, a rotary shaft, a pair of springs carried on said shaft being normally in contact with each other, one of said springs being in electrical contact with said shaft, an insulating sleeve surrounding said shaft separating the second one of said springs from the shaft, a conducting sleeve overlying said insulating sleeve and making electrical contact with the second one of said springs, and means for periodically separating said springs.

8. A circuit interrupter comprising in combination, a pair of rotatably mounted springs, each of said springs having a contact point and a wiper plate thereon, and one or more prongs adapted to pass between said wiper plates to separate said contacts upon each revolution of said springs.

9. A circuit interrupter comprising in combination, a pair of springs, each of which carries a contact and a wiper portion, and means for periodically inserting an element between said wiper portions to separate said contacts.

In witness whereof, I hereunto subscribe my name this 24th day of April A. D., 1911.

LOUIS J. FLINT.

Witnesses:
A. LYDA JONES,
HAZEL JONES.